US012646491B2

(12) United States Patent
Kim

(10) Patent No.: US 12,646,491 B2
(45) Date of Patent: Jun. 2, 2026

(54) BARREL FOR A WOODWIND INSTRUMENT

(71) Applicant: Jee Woo Kim, State College, PA (US)

(72) Inventor: Jee Woo Kim, State College, PA (US)

( * ) Notice: Subject to any disclaimer, the term of this patent is extended or adjusted under 35 U.S.C. 154(b) by 463 days.

(21) Appl. No.: 18/362,484

(22) Filed: Jul. 31, 2023

(65) Prior Publication Data

US 2024/0194169 A1 Jun. 13, 2024

Related U.S. Application Data

(60) Provisional application No. 63/387,232, filed on Dec. 13, 2022.

(51) Int. Cl.

| | |
|---|---|
| ***G10D 9/10*** | (2020.01) |
| ***G10D 7/066*** | (2020.01) |
| ***G10D 9/02*** | (2020.01) |

(52) U.S. Cl.

CPC ............... *G10D 9/10* (2020.02); *G10D 7/066* (2013.01); *G10D 9/02* (2013.01)

(58) Field of Classification Search

CPC ............ G10D 9/10; G10D 7/066; G10D 9/02; G10D 9/00; G10D 7/00

See application file for complete search history.

(56) References Cited

U.S. PATENT DOCUMENTS 6,054,644 A * 4/2000 Allen ...................... G10D 9/10 84/382

* cited by examiner

*Primary Examiner* — Kimberly R Lockett

(57) ABSTRACT

A barrel for a woodwind instrument comprising a threaded bore to promote airflow throughout a woodwind instrument, thus, reducing turbulence, limiting the reflection of sound waves, and producing a sound with reduced amplitudes of overtones. The reduction in turbulent flow, further limits backpressure within the instrument, enabling the user to reduce the effort required to perform actions such as tonguing on said instrument. The barrel for a woodwind instrument comprises a mouthpiece receiver and an upper joint receiver for attachment to a woodwind instrument.

20 Claims, 8 Drawing Sheets

BARREL FOR A WOODWIND INSTRUMENT

FIELD OF THE INVENTION

The present invention relates generally to a barrel for a woodwind instrument. More specifically, the present invention relates to a barrel having a threaded bore for a clarinet.

BACKGROUND OF THE INVENTION

A clarinet is a musical reed instrument that is part of a class of instruments commonly referred to as woodwind instruments. For over the past 150 years, the construction and components of the clarinet have been substantially the same. Since its conception, the clarinet has been a cylindrical tube comprised of a reed, a mouthpiece, a ligature, a barrel, an upper joint, a lower joint, and a bell. These components, including the barrel, have traditionally been crafted to comprise an inner bore with a smooth surface as to allow airflow to pass through, as it has been long believed that this was the only way to create a smooth sound and enjoyable playing experience for the user. In addition to these aforementioned components, the clarinet further comprises a plurality of rings to secure the components together. The mouthpiece, the upper joint, and the lower joint comprise of corked shafts which are used inserted into the adjacent component. The mouthpiece comprises a corked shaft that is inserted into the barrel by way of the mouthpiece receiver. The upper joint also comprises a corked shaft that is inserted into the barrel by way of an upper joint receiver. When these components are assembled, along with the lower receiver and the bell, the user is able to create sound by blowing into the reeded mouthpiece. The upper joint and the lower joint comprise of tone holes and keys with allow for the user to manipulate the sound produced by the instrument. As the user blows into the mouthpiece, the reed vibrates as the airflow from the user then travels from the mouthpiece, through the barrel, then through the upper joint and the lower joint, respectively, before exiting through the bell of the instrument. While the airflow passes through the upper joint and the lower joint, depending on the notes being played, the airflow may exit through various tone holes. The depth at which the barrel of the clarinet is placed on the corked shaft of the mouthpiece determines the tone and pitch of the instrument. Likewise, it is also more common amongst users to adjust the depth that the barrel is placed on the upper joint to change the tone and pitch of the instrument. Said depth is often manipulated to create a sound that is sharper or flatter in pitch. Commonly, users opt to change the barrel on the clarinet for various reasons including to change the pitch, the tone quality, and the playability of the instrument. Changing the barrel may change the resistance of airflow, which correlates to the difficulty to play the instrument, as well the overall sound and performance of the clarinet. Some clarinet users have an interest in producing a sound ranging from a dark sound to a bright sound. A modified barrel is one means of producing such variation in sound quality.

An objective of the present invention is to provide a way of enhancing the overall playing experience of clarinet users by creating a more desirable tone when using the instrument and reducing the difficulty to perform basic functions associated with using the clarinet such as tonguing notes and managing breath control as airflow is more uniform when using the present invention. An additional objective of the present invention is to reduce the backflow of air while using the clarinet. More specifically, the present invention reduces the reflected sound waves due to the changes in impedance, thus reducing the energy required to tongue notes. Furthermore, an objective of the present invention is to streamline airflow though the body of the instrument in manner more efficient than existing barrels. The present invention comprises barrel of a clarinet with a bore comprising threads. In alternative embodiments of the present invention, the bore of the barrel may comprise ribs or a texture of the like. In the preferred embodiment of the present invention the bore of the barrel comprises an internal threaded surface comprising a buttress thread.

SUMMARY OF THE INVENTION

The present invention is a barrel for a woodwind instrument having a threaded bore. The threaded bore includes a plurality of threads traversing the length of the threaded bore. In addition to the barrel having a threaded bore, the bore may also have a taper. Further, the barrel includes two receivers, one for receiving the mouthpiece of the instrument and one for receiving the upper joint of the instrument. The mouthpiece receiver and the upper joint receiver are positioned on opposite distal ends of the threaded bore.

DETAIL DESCRIPTIONS OF THE INVENTION

Figure 1:
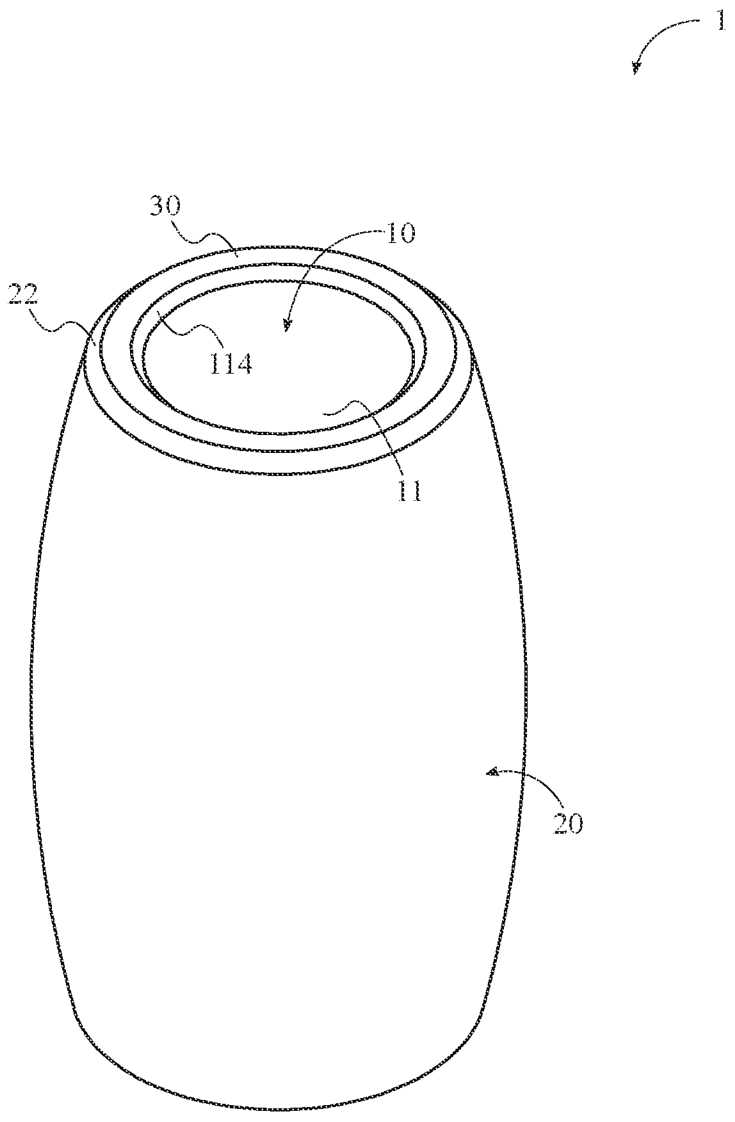
FIG. 1 is a perspective view of the present invention.

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, “a” and “an” each generally denotes “at least one,” but does not exclude a plurality unless the contextual use dictates otherwise. When used herein to join a list of items, “or” denotes “at least one of the items,” but does not exclude a plurality of items of the list. Finally, when used herein to join a list of items, “and” denotes “all of the items of the list.”

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification, and are to be considered a portion of the entire written description of this invention. As used in the following description, the terms “horizontal”, “vertical”, “left”, “right”, “up”, “down” and the like, as well as adjectival and adverbial derivatives thereof (e.g., “horizontally”, “rightwardly”, “upwardly”, “radially”, etc.), simply refer to the orientation of the illustrated structure as the particular drawing figure faces the reader. Similarly, the terms “inwardly,” “outwardly” and “radially” generally refer to the orientation of a surface relative to its axis of elongation, or axis of rotation, as appropriate. Additionally, the term “proximal” and “distal” are used herein as descriptions defined as “situated near the center of a body,” and “situated away from the center of the body,” respectively.

The present disclosure includes many aspects and features. Moreover, while many aspects and features relate to, and are described in the context of a barrel for a woodwind instrument 1, embodiments of the present disclosure are not limited to use only in this context.

In the context of the present invention, the term “threads” is intended to be interpreted as circumferential ridges. Further, in regard to the term “threads,” structures such as ridges, ribs, or textures of the like are intended to be included within such term as is the case within the context of the present invention. In some cases, threads may include spiral ridges, however, within the context of the present invention, it is not a limitation that must be upheld and rather the threads may include ridges are located on parallel planes, thus it is not a requirement that the threads are a single helical ridge traversing some distance as noted herein. Additionally, the threads within the present invention are not intended to act as a means of connection but rather a means for enhancing airflow.

As disclosed herein, FIG. 1-8 show and describe the present invention whereby said invention is a barrel for a woodwind instrument. The present invention, the barrel for a woodwind instrument, is also referred to herein as the barrel 1.

Figure 2:
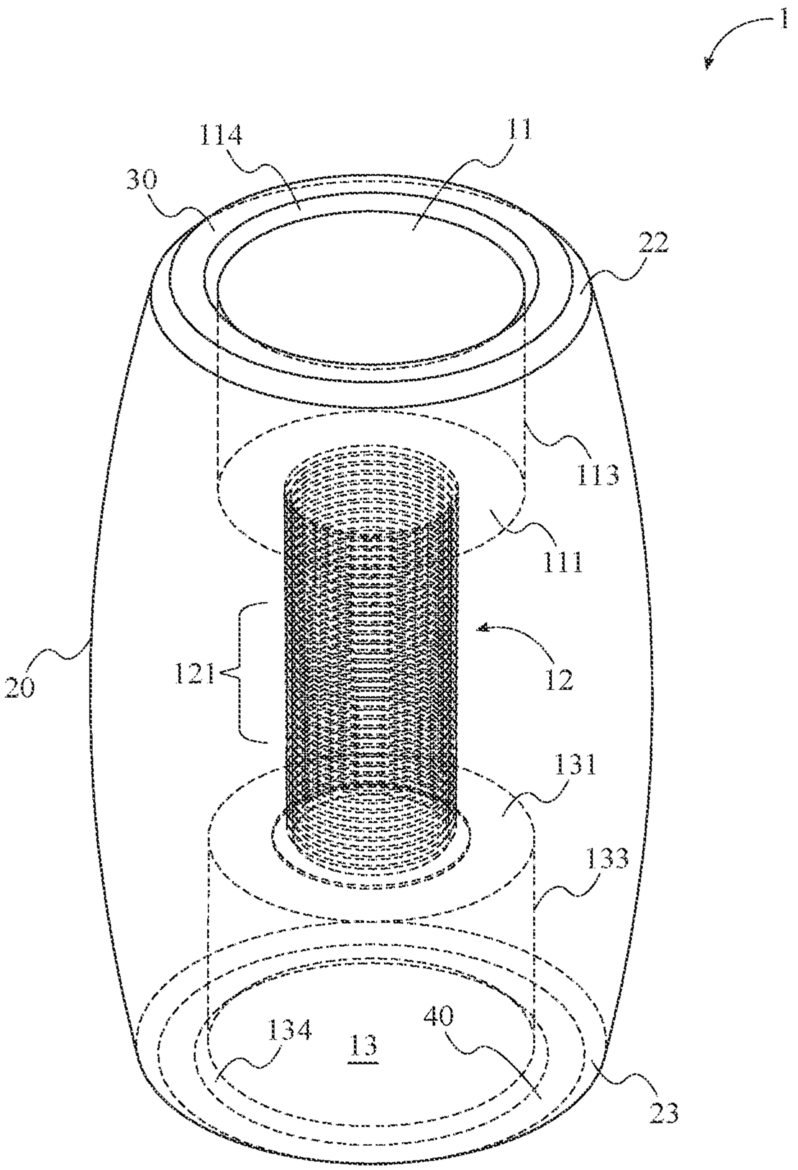
FIG. 2 is a perspective view of the present invention showing hidden lines thereof.

As shown in FIG. 1 and FIG. 2, the barrel 1 comprises a bore hole 10 whereby said bore hole 10 is a through hole, comprising a diameter, traversing the barrel 1. Within the context of the present invention, the term “bore” is defined as a through channel having a circular cross section. The bore hole 10 of the present invention further comprises a threaded bore 12 wherein the threaded bore 12 composes at least a section of the bore hole 10. The threaded bore 12 comprises a plurality of threads 121 circumferentially positioned within the threaded bore 12, also comprising a diameter, whereby each thread of the plurality of threads 121 is arranged in a linear coaxial alignment along at least a portion of the threaded bore 12. In the preferred embodiment of the present invention, the plurality of threads 121 is a plurality of buttress threads. In alternative embodiments of the present invention, other thread variations, ribs, or a textured surface may be used.

Figure 3:
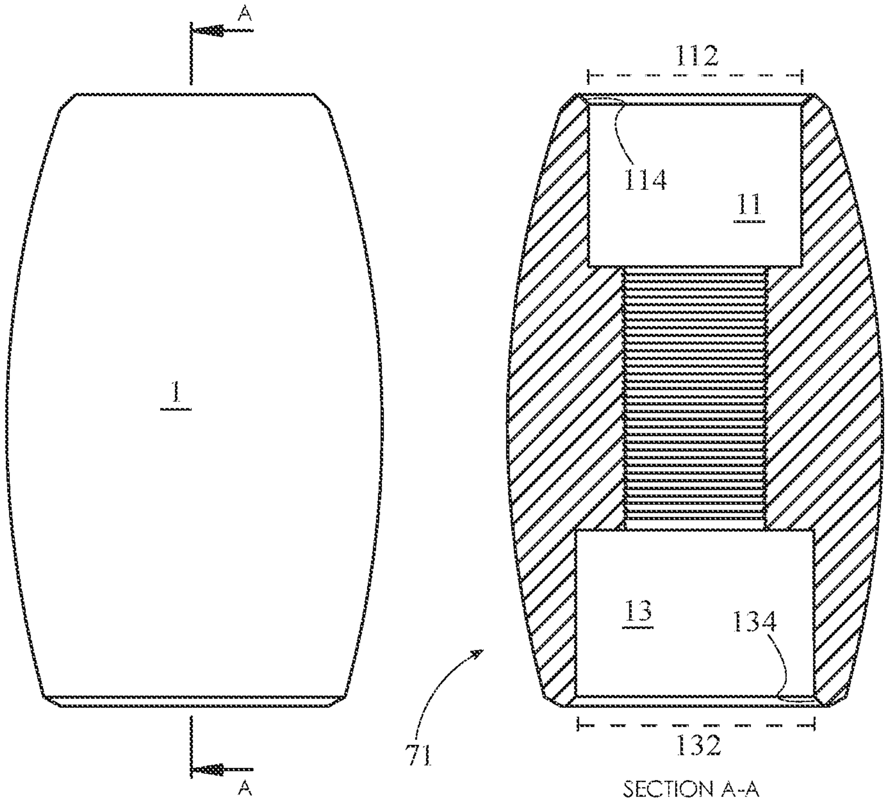
FIG. 3 is a section view of the present invention.

Furthermore, as shown in FIG. 2 and the sectional view 71 as shown in FIG. 3, the present invention further comprises a mouthpiece receiver 11 and an upper joint receiver 13. Furthermore, the present invention comprises a topmost upwardly facing surface and a bottommost downwardly facing surface, referred herein as the top face 30 and the bottom face 40, respectively. In the preferred embodiment of the present invention, the top face 30 is a parallel to the bottom face 40, each located on an opposite distal end of the barrel 1. The mouthpiece receiver 11 is a cylindrical cut-out, comprising a depth 113, traversing the bore hole 10 proximally from the top face 30 whereby the cut-out is coaxially aligned with the threaded bore 12. The upper joint receiver 13 is a cylindrical cut-out, also comprising a depth 133, traversing the bore hole 10 proximally from the bottom face 40 whereby the cut-out is coaxially aligned with the threaded bore 12. In the preferred embodiment, the mouthpiece receiver 11 comprises a diameter 112 greater than the diameter of the threaded bore 12. Likewise, in the preferred embodiment of the present invention, the upper joint receiver 13 comprises a diameter 132 greater than the diameter of the threaded bore 12.

Additionally, the present invention further two seats, a mouthpiece receiver seat 111 and an upper joint receiver seat 131. The mouthpiece receiver 11 comprises the mouthpiece receiver seat 111 wherein the mouthpiece receiver seat 111 is a surface located at the proximal end of the mouthpiece receiver 11 adjacent to the threaded bore 12. Likewise, the upper joint receiver 13 comprises the upper joint receiver seat 131 whereby the upper joint receiver seat 131 is a surface located at the proximal end of the upper joint receiver 13 adjacent to the threaded bore 12. In some embodiments of the present invention, the mouthpiece receiver 11 and the upper joint receiver 13 each comprise an interior bevel 114, 134. The interior bevel 114 of the mouthpiece receiver 11 is positioned circumferentially along the distal end of the mouthpiece receiver 11. Likewise, the interior bevel 134 of the upper joint receiver 13 is positioned circumferentially along the distal end of the upper joint receiver 13.

Figure 4:
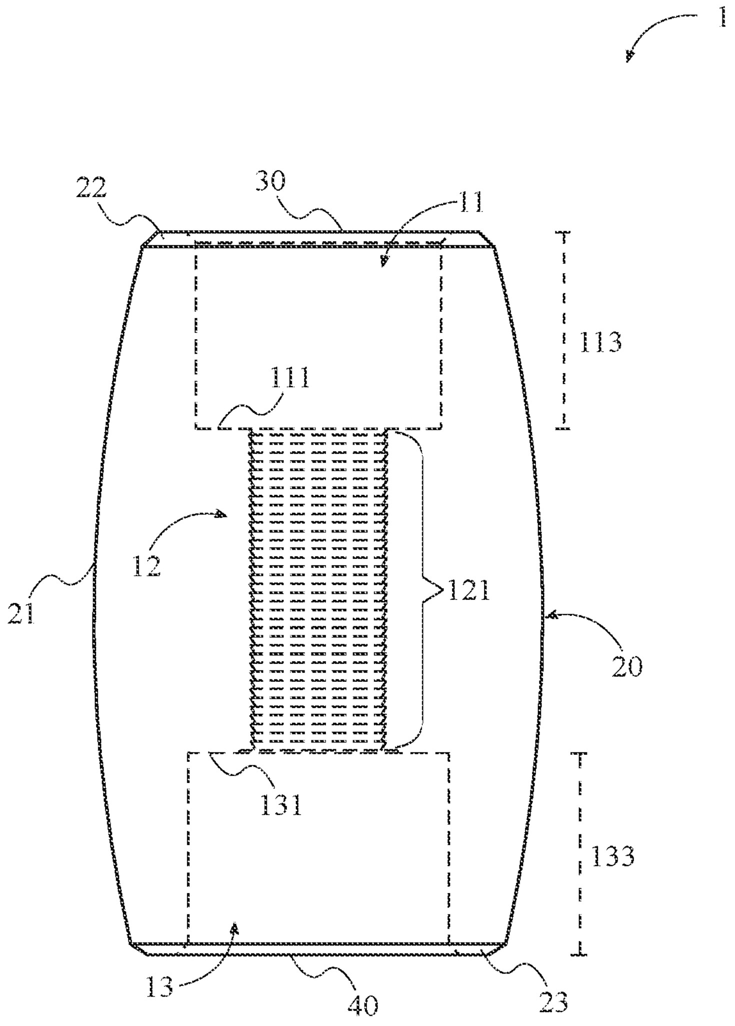
FIG. 4 is a side view of the present invention showing hidden lines thereof.

As shown in FIG. 4, in some embodiments of the present invention, the barrel 1 further comprises an outer surface 20 wherein said outer surface 20 comprises a convexity 21. In the aforementioned embodiment, the barrel 1 possesses a shape substantially similar to that of a prolate spheroid. Within the context of the present invention, "substantially similar" is intended to be defined as a three-dimensional shape having a cylindrical body including two parallel bases having a circular cross-sectional area and a side traversing the circumference wherein said side is uniformly convex. In some embodiments of the present invention, the barrel 1 further comprises two exterior bevels 22, 23, a first bevel 22 and a second bevel 23. The first bevel 22 positioned circumferentially about the outermost edge of the top face 30. The second bevel 23 positioned circumferentially about the outermost edge of the bottom face 40.

Figure 5:
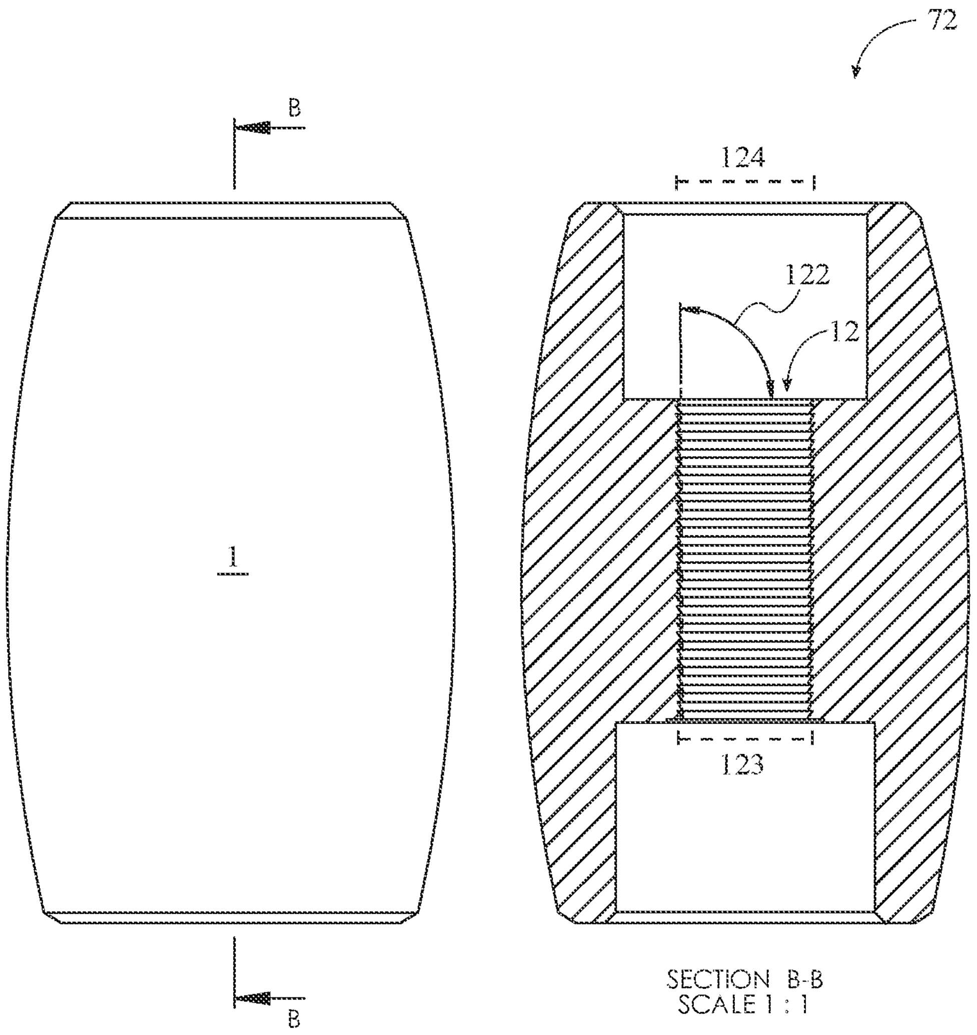
FIG. 5 is an alternative section view of an alternative embodiment of the present invention showing the taper of the bore hole.

In the preferred embodiment of the present invention, as shown in the sectional view 72 of FIG. 5, the threaded bore 12 comprises a taper 122. The threaded bore 12, comprising a diameter 123 at the mouthpiece receiver 11 and a diameter 124 at the upper joint receiver 13, in the preferred embodiment of the present invention, comprises the taper 122 insomuch that the diameter 123 at the mouthpiece receiver 11 and the diameter 124 at the upper joint receiver 13 comprise a difference. In some embodiments wherein the threaded bore 12 comprises the taper 122, the diameter 123 at the mouthpiece receiver 11 is greater than the diameter 124 at the upper joint receiver 13. Alternatively, in some embodiments of the present invention, the diameter 123 at the mouthpiece receiver 11 is less than the diameter 124 at the upper joint receiver 13.

Figure 6:
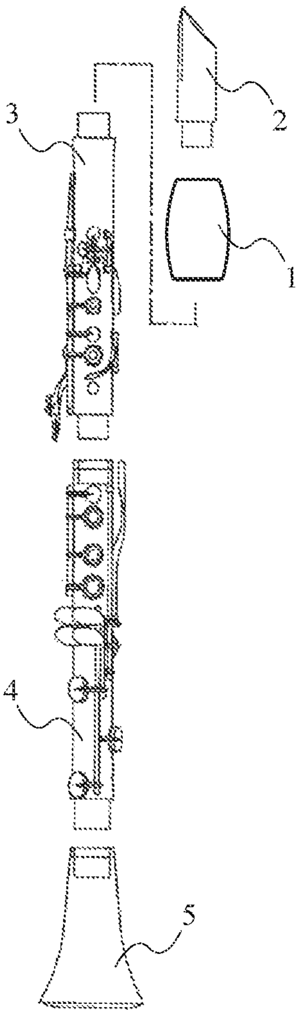
FIG. 6 is an exploded side view of the present invention in assembly with a clarinet.

In the preferred embodiment of the present invention, as shown in FIG. 6, the barrel 1 is intended to be attached to a woodwind instrument, specifically a clarinet, comprising a mouthpiece 2 and an upper joint 3. In the preferred embodiment, the barrel 1 is fitted onto a woodwind instrument whereby the mouthpiece 2 of the woodwind instrument is inserted into the mouthpiece receiver 11 and the upper joint 3 of the woodwind instrument is inserted into the upper joint receiver 13. Although the preferred embodiment of the present invention is to be used in an A/Bb clarinet assembly, the present invention is not to be limited to only a clarinet and may be used in other woodwind instruments including those of the clarinet family, including E clarinets, D clarinets, C clarinets, A clarinets, B clarinets, and basset clarinets; flutes, including piccolos; oboes, including the cor anglais and heckelphone; and bassoons, including the contrabassoon.

Figure 7:
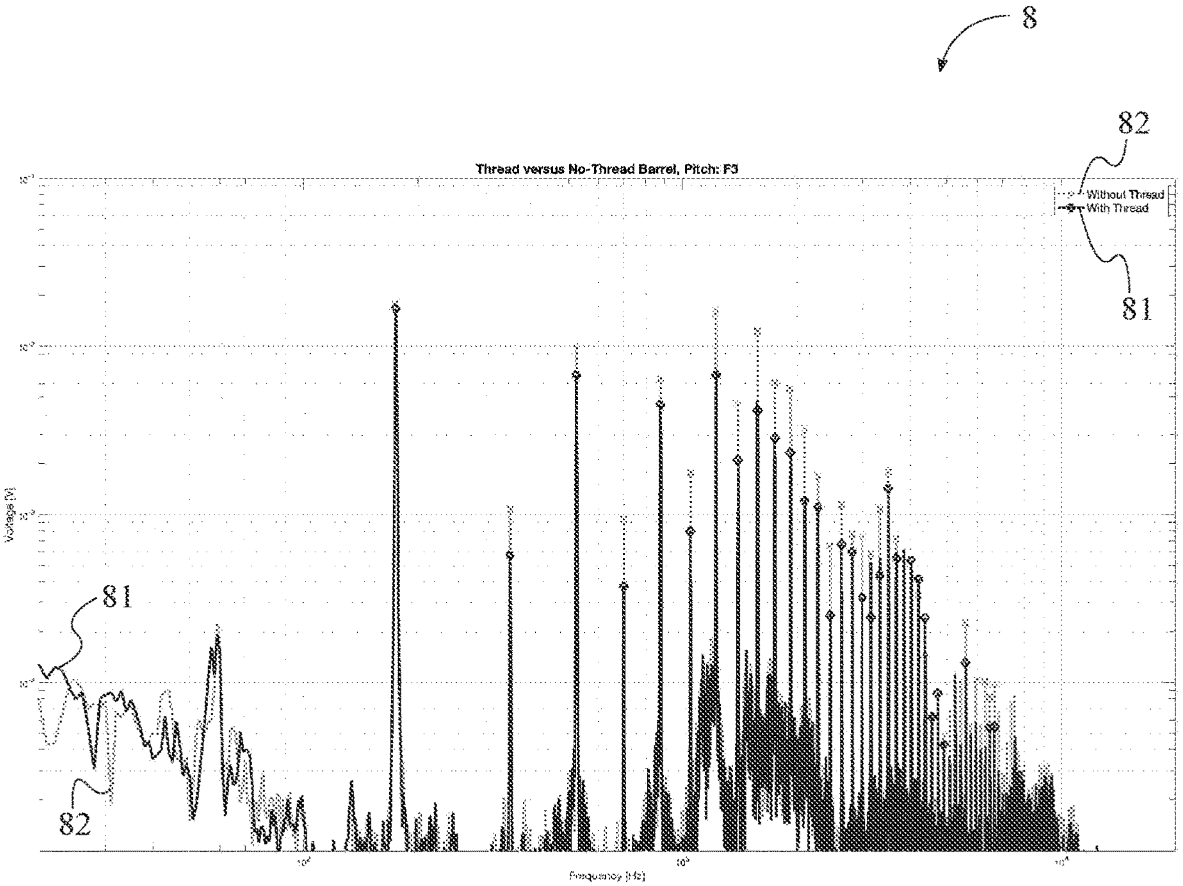
FIG. 7 is a graph showing the differences of frequency and amplitude of a non-threaded barrel and the present invention at a pitch of F3.
Figure 8:
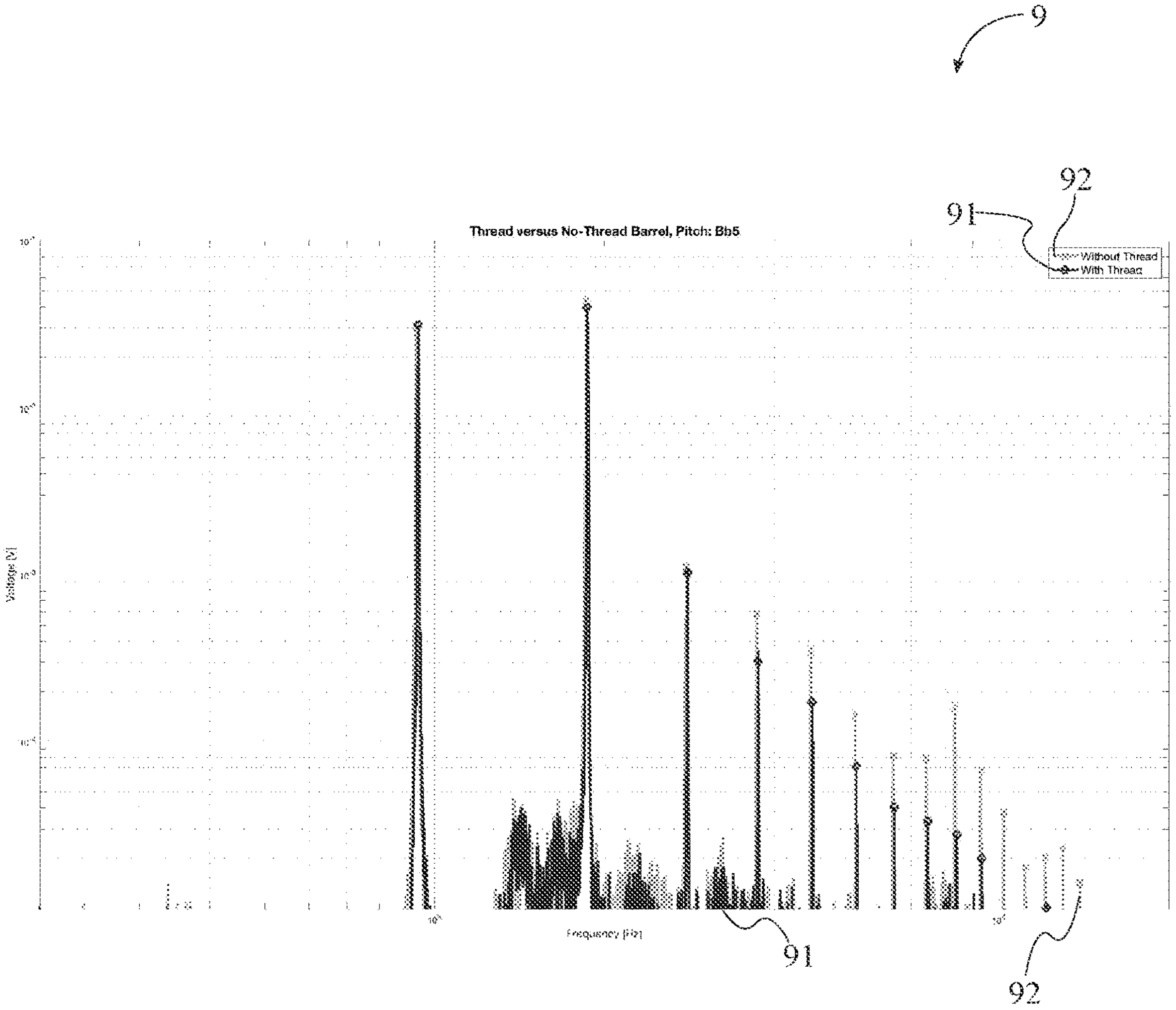
FIG. 8 is a graph showing the differences of frequency and amplitude of a non-threaded barrel and the present invention at a pitch of Bb5.

As shown in a series of graphs 8, 9 in FIG. 7 and FIG. 8, through the collection of experimental data, there is a difference between the sound, specifically the amplitude, of the present invention in comparison to a barrel having a non-threaded bore at varying frequencies for different pitches. As shown in FIG. 7, the graph 8 and data 81 depicting the present invention shows that that when used, the present invention consistently produces a sound having reduced overtones when compared to the data 82 of a nonthreaded barrel at F3. Likewise, as shown in FIG. 8, the graph 9 and data 91 depicting the present invention shows that that when used, the present invention consistently produces a sound having reduced overtones when compared to the data 92 of a nonthreaded barrel at Bb5. Thus, given the data 81, 82, 91, 92, it may be shown that there is an auditory difference between the sounds produced when using the present invention and those produced when using a non-threaded bore.

Lastly, within the preferred embodiment of the present invention, the best modes of manufacturing the present invention include CNC machining, 3D printing, and other manufacturing methods known to those skilled in the art. Additionally, within the preferred embodiment of the present invention, the barrel is composed of a material consisting of at least one of the following such as wood, plastic, rubber, or a material of the like known to those in the art. In embodiments wherein wood is the material composing the present invention, the preferred variation of wood is African Blackwood. In embodiments wherein plastic is the material composing the present invention, the preferred material is polyoxymethylene.

Although the invention has been explained in relation to its preferred embodiment, it is to be understood that many other possible modifications and variations can be made without departing from the spirit and scope of the invention.

What is claimed is:

1. A barrel for a woodwind instrument comprising a bore hole wherein said bore hole comprises a threaded bore;
- the threaded bore comprises a plurality of threads and a diameter;
- the bore hole is a through hole, comprising a diameter, traversing the barrel for a woodwind instrument; and
- the plurality of threads traverses an interior-facing surface of the bore hole, extending between a mouthpiece receiver and an upper joint receiver; and
- each thread of the plurality of threads is arranged in a linear coaxial alignment along the threaded bore.

2. The barrel for a woodwind instrument as claimed in claim 1, wherein:
- the mouthpiece receiver is a cylindrical cut-out comprising a diameter greater than the diameter of the threaded bore;
- the mouthpiece receiver traversing proximally from a distal end of the bore hole, whereby the cut-out is coaxially aligned with the threaded bore;
- the upper joint receiver is a cylindrical cut-out comprising a diameter greater than the diameter of the threaded bore; and
- the upper joint receiver, traversing proximally from a distal end of the bore hole opposite that of the mouthpiece receiver, whereby the cut-out is coaxially aligned with the threaded bore.

3. The barrel for a woodwind instrument as claimed in claim 2 wherein the mouthpiece receiver comprises a mouthpiece receiver seat whereby the mouthpiece seat is a surface located at the proximal end of the mouthpiece receiver adjacent to the threaded bore.

4. The barrel for a woodwind instrument as claimed in claim 2 wherein the upper joint receiver comprises an upper joint receiver seat whereby the upper joint receiver seat is a surface located at the proximal end of the upper joint receiver adjacent to the threaded bore.

5. The barrel for a woodwind instrument as claimed in claim 1 wherein the threaded bore comprises a taper.

6. The barrel for a woodwind instrument as claimed in claim 1 comprising an outer surface wherein said outer surface comprises a convexity whereby the barrel for a woodwind instrument possesses a shape substantially similar to that of a prolate spheroid.

7. The barrel for a woodwind instrument as claimed in claim 2 further comprising an interior bevel positioned circumferentially along the distal end of the mouthpiece receiver.

8. The barrel for a woodwind instrument as claimed in claim 2 further comprising an interior bevel positioned circumferentially along the distal end of the upper joint receiver.

9. The barrel for a woodwind instrument as claimed in claim 2 wherein the barrel for a woodwind instrument is fitted onto a woodwind instrument comprising a mouthpiece and an upper joint;

the mouthpiece of the woodwind instrument being inserted into the mouthpiece receiver; and the upper joint of the woodwind instrument being inserted into the upper joint receiver.

10. A barrel for a woodwind instrument comprising a bore hole wherein said bore hole comprises a threaded bore;

the threaded bore comprises a plurality of threads and a taper;

the bore hole is a through hole, comprising a diameter, traversing the barrel for a woodwind instrument; and the plurality of threads traverses an interior-facing surface of the bore hole, extending between a mouthpiece receiver and an upper joint receiver; and the threaded bore further comprising a diameter; and each thread of the plurality of threads is arranged in a linear coaxial alignment along the threaded bore.

11. The barrel for a woodwind instrument as claimed in claim 10, further comprising a mouthpiece receiver and an upper joint receiver;

the mouthpiece receiver is a cylindrical cut-out comprising a diameter greater than the diameter of the threaded bore;

the mouthpiece receiver traversing proximally from a distal end of the bore hole, whereby the cut-out is coaxially aligned with the threaded bore;

the upper joint receiver is a cylindrical cut-out comprising a diameter greater than the diameter of the threaded bore; and the upper joint receiver, traversing proximally from a distal end of the bore hole opposite that of the mouthpiece receiver, whereby the cut-out is coaxially aligned with the threaded bore.

12. The barrel for a woodwind instrument as claimed in claim 11 wherein the mouthpiece receiver comprises a mouthpiece receiver seat whereby the mouthpiece seat is a surface located at the proximal end of the mouthpiece receiver adjacent to the threaded bore.

13. The barrel for a woodwind instrument as claimed in claim 11 wherein the upper joint receiver comprises an upper joint receiver seat whereby the upper joint receiver seat is a surface located at the proximal end of the upper joint receiver adjacent to the threaded bore.

14. The barrel for a woodwind instrument as claimed in claim 11 comprising an outer surface wherein said outer surface comprises a convexity whereby the barrel for a woodwind instrument possesses a shape substantially similar to that of a prolate spheroid.

15. The barrel for a woodwind instrument as claimed in claim 12 further comprising an interior bevel positioned circumferentially along the distal end of the mouthpiece receiver.

16. The barrel for a woodwind instrument as claimed in claim 13 further comprising an interior bevel positioned circumferentially along the distal end of the upper joint receiver.

17. The barrel for a woodwind instrument as claimed in claim 14 wherein the barrel for a woodwind instrument is fitted onto a woodwind instrument comprising a mouthpiece and an upper joint;

the mouthpiece of the woodwind instrument being inserted into the mouthpiece receiver; and the upper joint of the woodwind instrument being inserted into the upper joint receiver.

18. A barrel for a woodwind instrument comprising a bore hole wherein said bore hole comprises:

a threaded bore comprising a plurality of threads;

a mouthpiece receiver; and an upper joint receiver;

the bore hole is a through hole, comprising a diameter, traversing the barrel for a woodwind instrument; and the plurality of threads is circumferentially positioned within the threaded bore, also comprising a diameter, whereby each thread of the plurality of threads is arranged in a linear coaxial alignment along the threaded bore;

the mouthpiece receiver is a cylindrical cut-out comprising a diameter greater than the diameter of the threaded bore;

the mouthpiece receiver traversing proximally from a distal end of the bore hole, whereby the cut-out is coaxially aligned with the threaded bore;

the upper joint receiver is a cylindrical cut-out comprising a diameter greater than the diameter of the threaded bore; and the upper joint receiver, traversing proximally from a distal end of the bore hole opposite that of the mouthpiece receiver, whereby the cut-out is coaxially aligned with the threaded bore.

19. The barrel for a woodwind instrument as claimed in claim 18 wherein the barrel for a woodwind instrument is fitted onto a woodwind instrument comprising a mouthpiece and an upper joint;

the mouthpiece of the woodwind instrument being inserted into the mouthpiece receiver; and the upper joint of the woodwind instrument being inserted into the upper joint receiver.

20. The barrel for a woodwind instrument as claimed in claim 19 wherein the threaded bore comprises a taper.

* * * * *